US012575477B2

(12) United States Patent
Ferneding et al.

(10) Patent No.: US 12,575,477 B2
(45) Date of Patent: Mar. 17, 2026

---

(54) ELECTRIC-POWERED BULK MATERIAL DISPERSING SYSTEM AND METHOD OF USE

(71) Applicant: DHG, Inc., Fairfield, OH (US)

(72) Inventors: Mark Edward Ferneding, Okeana, OH (US); Aaron Kime, Fairfield, OH (US)

(73) Assignee: DHG, Inc., Fairfield, OH (US)

( * ) Notice: Subject to any disclaimer, the term of this patent is extended or adjusted under 35 U.S.C. 154(b) by 765 days.

(21) Appl. No.: 17/319,434

(22) Filed: May 13, 2021

(65) Prior Publication Data

US 2021/0352838 A1 Nov. 18, 2021

Related U.S. Application Data

(60) Provisional application No. 63/026,333, filed on May 18, 2020.

(51) Int. Cl.
| | |
|---|---|
| *A01C 7/00* | (2006.01) |
| *A01C 19/02* | (2006.01) |
| *A01C 23/00* | (2006.01) |
| *B05B 1/34* | (2006.01) |
| *B05B 7/14* | (2006.01) |

(52) U.S. Cl.
CPC .............. *A01C 7/004* (2013.01); *A01C 19/02* (2013.01); *A01C 23/005* (2013.01); *B05B 1/3402* (2018.08); *B05B 7/1481* (2013.01)

(58) Field of Classification Search
CPC ... B05B 7/1481; B05B 7/3402; A01C 23/005; A01C 7/004
See application file for complete search history.

(56) References Cited

U.S. PATENT DOCUMENTS

| | | | | |
|---|---|---|---|---|
| 2,878,617 | A | 3/1959 | Finn | |
| 3,310,237 | A | 3/1967 | Welch | |
| 3,931,930 | A * | 1/1976 | Waldrum | A01M 7/0042 |
| | | | | 239/587.2 |
| 4,821,768 | A | 4/1989 | Lett | |
| 5,012,974 | A * | 5/1991 | Johnson | A01C 7/004 |
| | | | | 239/142 |
| 6,482,541 | B1 * | 11/2002 | Bator, Jr. | H01M 50/224 |
| | | | | 429/96 |

(Continued)

OTHER PUBLICATIONS

International Search Report and Written Opinion mailed Sep. 6, 2021 in reference to co-pending patent Application No. PCT/US2021/032900 filed May 18, 2021.

(Continued)

*Primary Examiner* — Jason J Boeckmann
(74) *Attorney, Agent, or Firm* — Dinsmore & Shohl LLP

(57) ABSTRACT

An electric-powered bulk material dispersing system and method of use. The electric power is provided by a battery system with one or more electric motors to replace traditional internal combustion engines. The electric motor or motors are used to provide pressure to one or more pumps that may be used in conjunction with various tubes, hoses or related conduit and spray nozzles in order to disperse a bulk material such as seed, mulch, compost, chipped wood, grain, hay, fertilizer, herbicide, pesticide, plastic pellets, salt, sand or the like that has been combined or suspended within a fluent material. In one form, the bulk material dispersing system may be used as a bulk hydroseeder.

17 Claims, 7 Drawing Sheets

(56) References Cited

U.S. PATENT DOCUMENTS

| | | | | |
|---|---|---|---|---|
| 9,185,840 B2* | 11/2015 | Crivello | ................. | A01C 7/004 |
| 2017/0129605 A1* | 5/2017 | Wu | ........................ | B05B 12/02 |
| 2019/0090407 A1* | 3/2019 | Kime | .................... | A01C 7/004 |

OTHER PUBLICATIONS

International Preliminary Report on Patentability mailed Mar. 3, 2022 in reference to related patent Application No. PCT/US2020/046794 filed Aug. 18, 2020 (8 pages).
International Search Report and Written Opinion mailed Nov. 26, 2020 in reference to related patent Application No. PCT/US2020/046794 filed Aug. 18, 2020 (14 pages).

* cited by examiner

ELECTRIC-POWERED BULK MATERIAL DISPERSING SYSTEM AND METHOD OF USE

This application claims priority to U.S. Provisional Application 63/026,333 that was filed on May 18, 2020.

The present disclosure generally relates to systems for dispersing bulk materials over large areas and methods of their use, and more particularly to a bulk material dispersing system that primarily relies upon electricity rather than an internal combustion engine for its source of power as a way to disburse a bulk material.

BACKGROUND

The distribution of bulk materials has been revolutionized by the introduction of bulk material spreading machinery. One such example is a hydroseeding system, including those sold commercially by the Assignee of the present disclosure, such the T330 Super HydroSeeder®, the T400 Super Hydro-Seeder®, the T170 HydroSeeder®, the LF120 Hydro-Seeder®, the T120 HydroSeeder®, the T90 HydroSeeder®, the T75 HydroSeeder®, the T60 HydroSeeder®, the T30 HydroSeeder®, the Titan HT330 HydroSeeder® and the Titan HT400 HydroSeeder®.

Conventional ways to provide the energy necessary to disseminate the bulk material over long distances (such as between approximately fifty feet to over two hundred feet or more) include using an internal combustion engine (ICE). Typically, such ICEs are configured as a compression ignition engine (such as those that normally operate on diesel-based fuels) or a spark ignition engine (such as those that normally operate on gasoline-based fuels) in order to directly or indirectly operate a pump that in turn pressurizes and conveys the bulk material of through valves, piping, hoses, nozzles and related equipment in order to spread the bulk material in a timely and efficient manner over large tracts of land. Such ICEs—while providing portability in addition to ample power with which to pressurize and distribute the slurry—are coming under increased scrutiny for their perceived impact on the environment. For example, increasingly strict environmental regulations in the United States and elsewhere are making it difficult to operate bulk material dispersing systems using ICEs. Alternative energy sources, such as solar, wind or the like—and that are intended for use in operating a bulk material dispersing system as a way to avoid the negative environmental impacts associated with ICE operation—are either not sufficiently robust or require sizewise prohibitive architectures in order to achieve adequate bulk material spray distance and coverage parameters. Accordingly, a need exists for alternative ways to provide power to a bulk material dispersing system that overcomes the problems presented by these aforementioned power sources.

BRIEF SUMMARY

The present disclosure generally relates to systems for dispersing bulk materials over large areas and methods of their use, and more particularly to a bulk material dispersing system that primarily relies upon electricity rather than an internal combustion engine for its source of power as a way to disburse a bulk material.

According to an aspect of the present disclosure, a bulk material dispersing system is disclosed. The bulk material dispersing system includes a raw material hopper and agitator configured to contain and mix a slurry, respectively, one or more electric motors, a battery system configured to provide electric current to at least one of the electric motors, one or more pumps each cooperative with a respective one of the electric motors in order to receive motive power therefrom and a slurry discharge assembly in fluid communication with the raw material hopper.

According to another aspect of the present disclosure, a method of dispersing a slurry using a bulk material dispersing system is disclosed. The method includes configuring the bulk material dispersing system to include a raw material hopper with an agitator disposed therein, a plurality of electric motors, a battery system configured to provide electric current to one or more of the electric motors, a plurality of pumps each cooperative with a respective one of the electric motors and a slurry discharge assembly in fluid communication with the raw material hopper. In this way, when a user of the system provides operating instructions, the battery system provides a substantial entirety of the power required to operate the plurality of pumps, plurality of electric motors and slurry discharge assembly such that the slurry is dispersed from the bulk material dispersing system.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
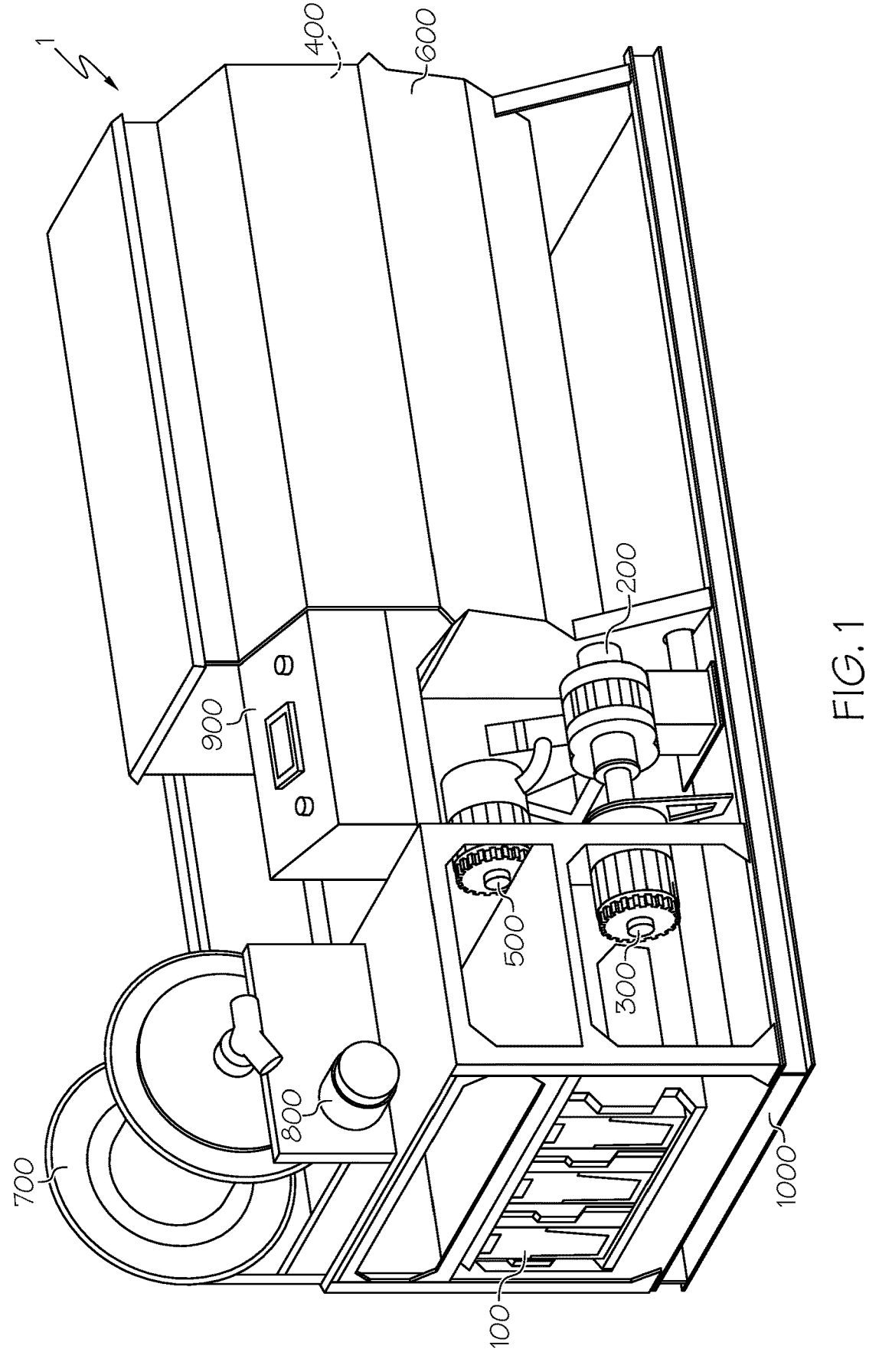
FIG. 1 depicts a right rear perspective view of an embodiment of the electric-powered bulk material dispersing system.

Referring first to FIGS. 1 through 3B, various views of an embodiments of a bulk material dispersing system 1 are shown. Depending on the size or configuration of the bulk material dispersing system 1, additional equipment (such as a boom, tower monitor or other ancillary equipment, not presently shown but some of which are discussed in more detail as follows) may be included. It will be appreciated that all such sizes and configurations are within the scope of the present disclosure, including (but not limited to) those with capacities of 300, 600, 750, 900, 1200, 1700, 3300 and 4000 gallons, respectively. Related to the size and dispersing capacity of the bulk material dispersing system 1 is the way it can be moved. For example, in one form, the bulk material dispersing system 1 may be self-contained on its own dedicated, integrated truck or related vehicular platform, while in another form, it may be removably mounted on a trailer, pallet or stand. As with the size and dispersing capacity, it will be appreciated that all such platforms, trailers, pallets, stands or the like to which the bulk material dispersing system 1 are coupled are within the scope of the present disclosure.

The embodiments bulk material dispersing system 1 are notionally depicted as a bulk hydroseeder, where a seed-containing slurry or hydromulch may be spread over large swaths of land for the purpose of planting grass or related vegetation as an alternative to traditional broadcast seeding, sod placement or the sowing of dry seed. Within the present disclosure, the term "slurry" generally describes a mixture of liquid (typically water), seed and mulch or related bulking agent the last of which is to increase one or more of viscosity, thickness and adherence of the dispersed bulk material, along with optional additives such as herbicides, fertilizer, colorants or the like. Likewise, the bulk material dispersing system 1 may also be configured as a landfill machine for other purposes where a different type of bulk material may be sprayed over long distances as a way to cover or fill a tract of land. Although not shown, other examples of additional embodiments include straw blowers, mulch blowers, bark blowers, disinfectant sprayers or the like as a way to achieve a variety of land coverage objectives such as erosion control, landscaping, post-construction remediation, fire remediation or the like. It will be appreciated that all such embodiments are within the scope of the present disclosure. Within the present disclosure, the bulk nature of the bulk material dispersing system 1 is to be contrasted with small, portable units (such as those that fit as a backpack or a wagon-towed or cart-towed device) that—by virtue of their low mulch, liquid or other hydroseeding raw material capacities of a few gallons or less and relatively short hoses and low-pressurization and low-pumping capacity levels—may be carried or pulled with relative ease by a single operator.

The bulk material dispersing system 1 is equipped with a slurry pump 200, slurry pump motor 300, agitator 400, agitator motor 500, raw material hopper 600, hose reel 700 (accompanying hose not shown for clarity), hose reel motor 800 and operator control panel 900, all of which may be secured to a frame 1000 that may—depending on the size, act as a mounting skid or the like. Although not shown, other additional equipment such as an oil pump, valves, piping, containers, support structure or the like, are also included. While not shown, the ancillary structure necessary to provide such hydraulic or pneumatic operation is deemed to be within the scope of the bulk material dispersing system 1.

The bulk material dispersing system 1 is further equipped with a battery system 100 for providing electric power to one or more of the aforementioned components in order to provide system operation that includes (among other things) the slurry pumping. In one form, the battery system 100 maybe configured as an array of various batteries or battery packs each of which may in turn be made up of multiple individual battery cells. In one form, such batteries that make up the battery system 100 may be made from known active ingredients, such lithium-ion, lead acid, nickel metal hydride or the like. In particular, the battery system 100 may be used to power one or more additional electric motors such as permanent magnet synchronous motors (including when configured as a traction motor), brushless direct current motors, AC induction (also referred to as squirrel cage, including those with increased magnetic permeability property) motors or the like. Similarly, all of the electric motors discussed herein may be directly coupled to the components for which they are powering or may power one or more hydraulic pumps that, in turn, provide hydraulic power to one or more hydraulic motors that are coupled to such components. The electric motors may be directly controlled in terms of speed, power output, torque output or the like to provide operator control over the output of the one or more components discussed herein. In another form, the various electric motors may operate at a set speed such that control over the various components may be regulated by control valves and an associated hydraulic system (not shown). In situations where permanent magnet synchronous motors are used, high temperature remanence and coercivity may be enhanced (and saturation magnetization decreased) through the use of sintered magnets with rare earth additions.

Within the present disclosure, the term "motive power" includes that power (whether in electric current, mechanical, hydraulic or pneumatic form) provided either directly or indirectly from the battery system 100 to one or more of the electric motors, pumps and other cooperative systems or components in order to discharge the slurry or other bulk material from a slurry discharge assembly or related output from the bulk material dispersing system 1. Likewise, such slurry discharge assembly includes those components that fluidly cooperate with one another in order to route the pumped slurry from the raw material hopper 600 to a receiving plot of land or related workpiece.

Figure 2:
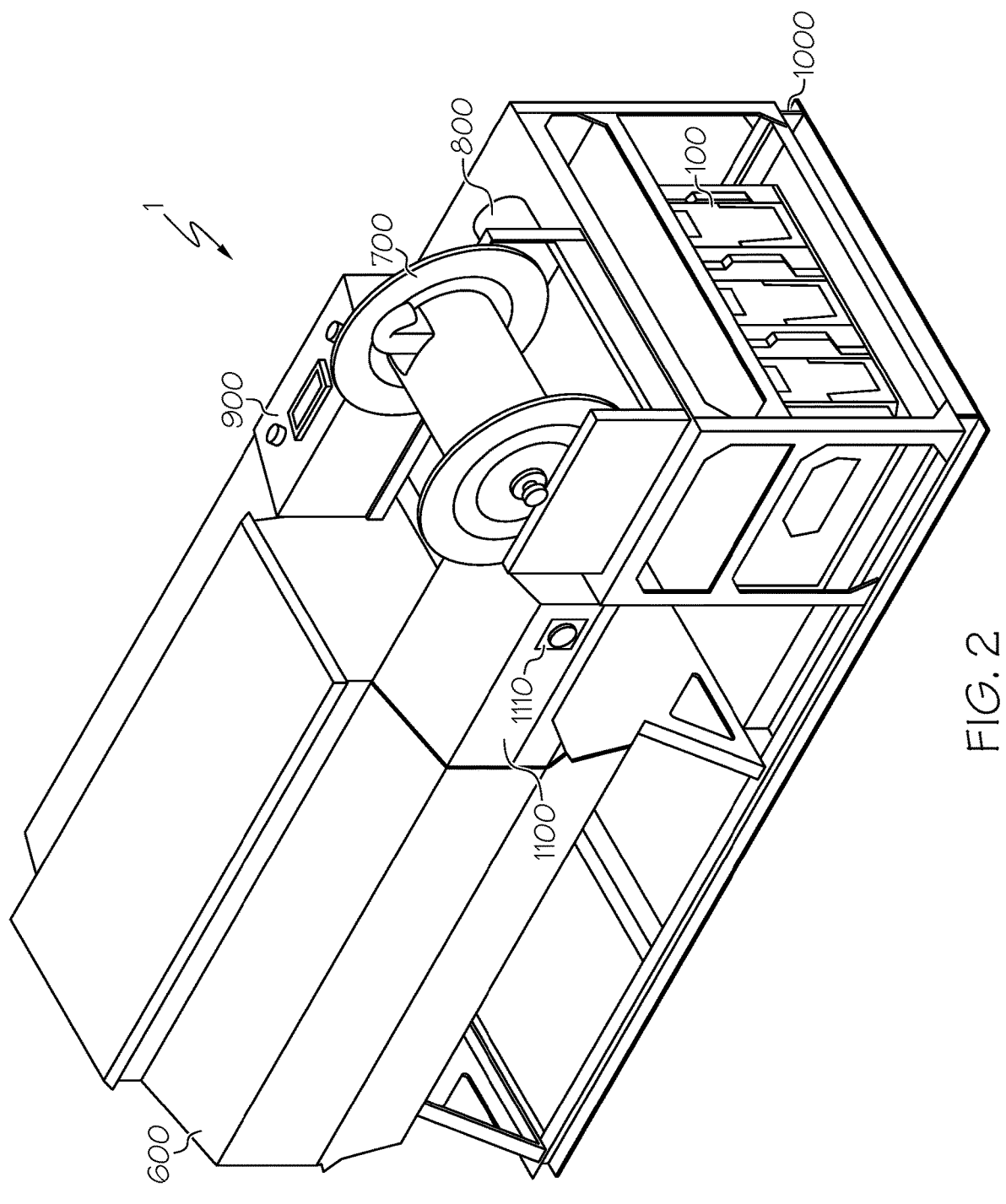
FIG. 2 depicts a left rear perspective view of the electric-powered bulk material dispersing system of FIG. 1.

As shown with particularity in FIG. 2, a battery charging system 1100 with battery charging port 1110 provide recharging capability to the battery system 100 such as through connection to a 120 or 240 volt alternating current (AC) source. In another form, the battery system 100 may be charged from an external generator or, in the case of a hybrid version of the bulk material dispersing system 1, an onboard ICE (not shown). In addition to slurry pumping (which is generally a hydraulic operation), power derived from the battery system 100 may be used to perform bulk material agitation, hose reel 700 actuation, bale grinding (where a bale of hay or related fibrous material may be dropped into or otherwise introduced to the raw material hopper 600 for grinding and subsequent mixing with water or another liquid to promote slurry formation), material blowing (which is generally a pneumatic operation) or other operations.

Figure 3A:
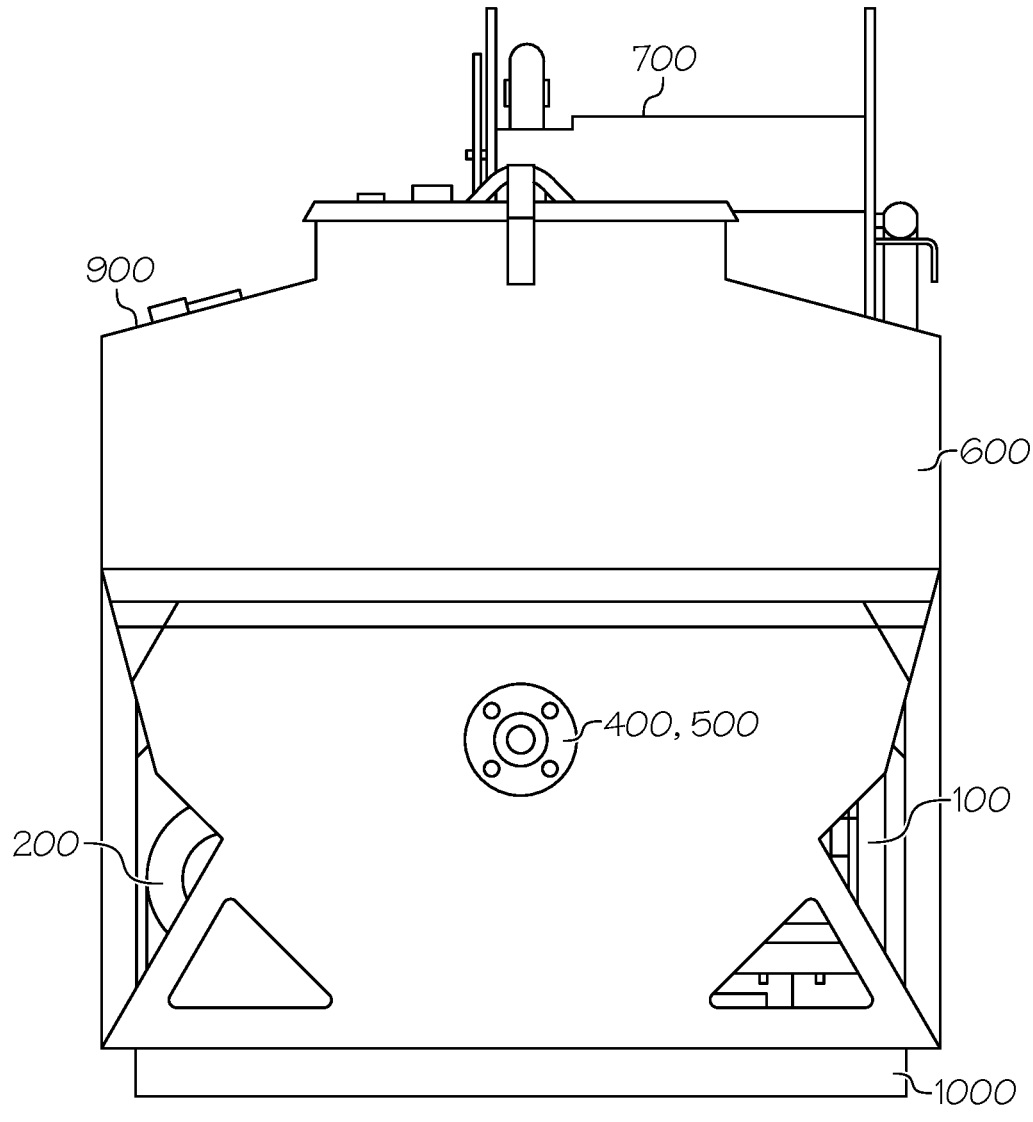
FIG. 3A depicts a front elevation view of the electric-powered bulk material dispersing system of FIG. 1.
Figure 3B:
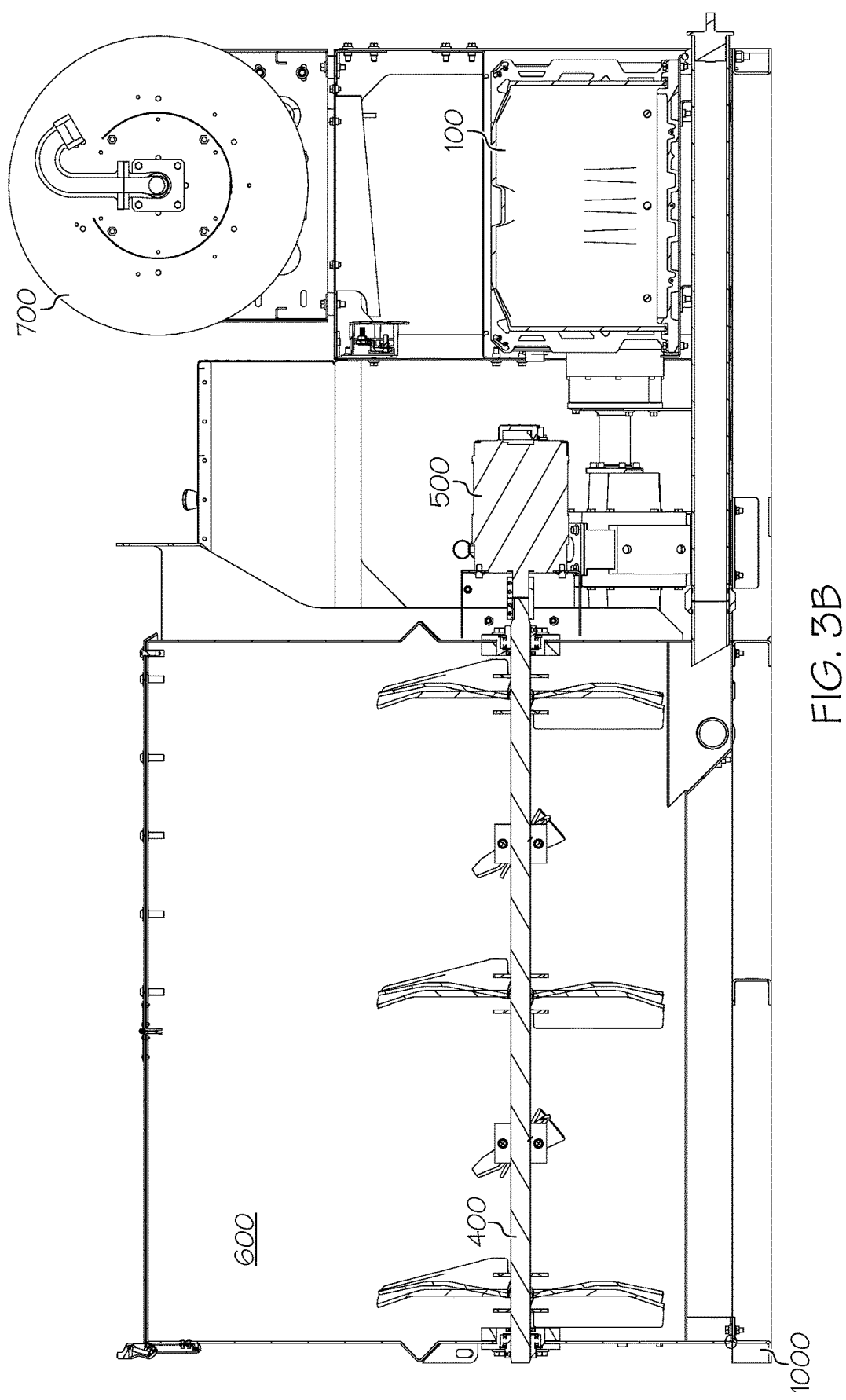
FIG. 3B depicts a side cutaway view of the electric-powered bulk material dispersing system of FIG. 3A.

The embodiment depicted in the figures generally corresponds to a lower-capacity system where the raw material hopper 600 may function as a tank or reservoir with which to hold approximately 300 gallons of slurry or related material. In one non-limiting form, such an embodiment may be used to provide landfill cover, and may be adapted to rest upon a tow-behind trailer (not shown). As discussed elsewhere, the volumetric capacity of the raw material hopper 600 may be greater or lesser, depending on the size and dispersal requirements of the bulk material dispersing system 1. Furthermore, in one form as shown in FIG. 3B, the agitator 400 may be disposed within and aligned relative to the raw material hopper 600 such that their axially elongate dimensions coincide.

In one form, the slurry pump 200 and agitator 400 of the larger configurations of the bulk material dispersing system 1 may be independently controlled (such as through the operator control panel 900). Independent control of these components allow for increased flexibility by providing the ability to control the spray distance and slurry discharge while maintaining a homogeneous slurry mixture. In one form, the agitator 400 may be part of a larger agitation system, such as an independently controlled twin mechanical paddle agitation system along with liquid recirculation and hydraulics (none of which are shown) to facilitate movement of the bulk material while onboard. The agitator acts to prevent so-called "bridging" of the bulk material, thereby keeping it evenly dispersed and encouraging a continuous feed of bulk material through am opening in the raw material hopper 600.

Although described as a slurry pump 200, it will be appreciated that other pump forms may be used as well, depending on the nature of the bulk material being dispersed. Likewise, there may be more than one type of pump included within the bulk material dispersing system 1. In one form, the slurry pump 200 may be of centrifugal design, for example, having 5 in.×2½ in. impeller capable of delivering 400 gpm @ 130 psi, 1 in. (2.5 cm) solid clearance, while the delivery of power to the pump may take place independently of movement power delivered to the agitator 400.

Using the battery system 100 coupled to the slurry pump 200 allows for the long-range discharge of the slurry from the bulk material dispersing system 1, while the battery system 100 may also be separately coupled to the agitator 400 and its one or more shafts to maintain the slurry in a relatively homogeneous consistency. In another form (not shown), the battery system 100 may be in the form of numerous individual motors each dedicated to providing power to a particular components such as the slurry pump 200, agitator 400, oil pump or the like.

Instead of having a relatively high-power ICE such as a diesel or gasoline engine that may be rated at roughly 130 horsepower (which in one form may be cooperative with a larger-capacity embodiment of the bulk material dispersing system 1), the battery system 100 is configured to provide the necessary electric power to run the various components, including the motors 300, 500 and 800, pumps (such as the slurry pump 200), agitator 400, operator control panel 900, as well as any electric current-consuming device, component or piece of equipment associated with the bulk material dispersing system 1. Such an embodiment as that depicted in the figures—when configured as a hydroseeder—may have a spray distance of up to 360 feet from point of discharge from a spray nozzle such as those depicted in FIGS. 4 and 5A through 5C. In a smaller embodiment the bulk material dispersing system 1—when configured as a hydroseeder—may have a spray distance of up to 70 feet from point of discharge from its spray nozzle. As previously noted, the slurry pump 200 may be driven independently of agitator 400 operation. In one smaller form, the slurry pump 200 may be a centrifugal design with a 3"×1½" (7.5 cm×3.75 cm) impeller capable of delivering about 65 GPM @ 60 psi (227 lpm @ 414 kPa), ¾" (1.9 cm) solid clearance.

In one form, the agitator 400 may be hydraulically-driven and reversible while in another form, directly powered though the agitator motor 500 that in turn is either directly coupled to the battery system 100 or indirectly.

In one non-limiting form, the raw material hopper 600 may be sized to have a working capacity of 1000 gallons and maximum material capacities of 3200 pounds for granular solids and 500 pounds of fiber mulch. As with the embodiment of FIG. 1, the embodiment of FIG. 3 may include a tower-based broadcasting mechanism. With the battery system 100 delivering about 35 horsepower (26) kilowatts of power, coupled to a centrifugal or vortex pump having a 4"×2" (10 cm×5 cm) impeller capable of delivering 170 gpm at 100 psi, a tower discharge distance of up to 180 feet is possible. The various components—as well as the battery system 100—are protected from landfill debris with the inclusion of various guards and skid plates. Likewise, increased clearance of the platform by heavy-duty tandem 10,000-pound rubber torsion suspension axles, along with tubeless, high flotation tires with a wide tread design allow for improved maneuvering on uneven surfaces and rough terrain. As previously discussed, whether the bulk material dispersing system 1 is placed on a tow-behind trailer or truck depends on various end-use factors, including the size of the raw material hopper 600 and corresponding amount of bulk material being dispersed.

In addition, a large slide-gate (not shown) may be included for ease of on-deck stowage of the bulk material, such as mulch or the like, while the raw material hopper 600 may include a loading hatch with curb side hinge for quicker, more efficient loading of the bulk material. A tower-based broadcaster may be included to allow an operator to control spraying while standing on-deck; such tower-based broadcasting may be done in lieu of the hose-based approach. In another form where a walk-behind or other non-tower spraying approach is used, the hose reel 700 may include hydraulic or other forms of hose retraction or extension for ease of hose stowage and deployment.

In one form, the hose reel motor 800 operates to be electrically retract the hose reel 700. For example, and depending on the length of the hose, the hose reel motor 800 is a 12 volt electric motor.

In one form, the operator control panel 900 includes ancillary equipment such as controllers and related electronic components. In one form, the operator control panel 900 is generally referred to as having a von Neumann architecture, and as such is configured to perform specific automated steps consistent with the various procedures, methods, steps and related operations that are outlined in this disclosure. In one form of operation, source code (such as that created by a programmer) that is used as instructions in order to have the one or more components disclosed herein perform the bulk material dispersing operations disclosed herein may be converted into executable form as machine code for use by the controller or related processor that makes up a portion of the operator control panel 900; such machine code is predefined to perform a specific task in that it is taken from a machine language instruction set known as the native instruction set that may be part of a shared library or related non-volatile portion of a non-transitory memory and that is specific to the implementation of the processor and its particular Instruction Set Architecture (ISA). This in turn allows the processor to perform a predefined set of operations in response to receiving a corresponding instruction selected from the predefined native instruction set, where at least a portion of the program or programs include a set of machine codes selected from the native instruction set and operated upon by the processor and other portions of the bulk material dispersing system 1 to perform one or more of the operations as described herein. In a similar manner, the source code may be written as an object oriented programming language, which has classes of data and methods, or a procedure programming language, which has routines, subroutines, or functions, and it will be appreciated that these forms and their variants are within the scope of the present disclosure.

Within the present disclosure, the machine code forms one or more pieces of program structure that may be arranged as a set or related ordered sequence capable of operating upon particular pieces of data structure (which may, for example, be in the form of numeric values organized as trees, graphs, link lists, arrays, records, classes, unions or the like). Moreover, the particular pieces of data structure (such as stored within a database that in turn may be stored on memory or related non-transitory computer readable media) in one or more of such trees, graphs, link lists, arrays or related forms may be operated upon by the one or more pieces of the program structure in order to achieve the operational functionality disclosed herein. In this way, any procedural flow of instructions and related operations (such as may be embodied in one or more flow diagrams, not shown) illustrate in a procedural way program structure that is executed by the operator control panel 900, controllers or the like in order to implement one or more aspects of the disclosure.

Referring next to FIGS. 4 and 5A through 5C, a discharge apparatus (also referred to as a spray nozzle monitor, depending on the size of the bulk material dispersing system 1) 1200 and spray nozzles 1300 (FIG. 4) and 1400 (FIGS. 5A through 5C) may be affixed to the end of a hose that—although not shown—is understood as being wrapped around a main spindle of the rotatable hose reel 700 of FIGS. 1 through 3B for configurations with tower-based spraying. The spray nozzles 1300, 1400 differ in how they may be configured with various discharge configurations, depending on the particular flow characteristics of the bulk material being dispersed. As such, their outlet (also referred to as discharge orifice, such as outlet 1420 of FIG. 5C) may be configured to promote narrow fan, wide fan and long distance dispersal attributes, depending on the need. As can be seen, the spray nozzle monitor 1200 may be pivoted around various horizontal and vertical axes for a complete range of spray nozzle movement for configurations where the dispersing of the bulk material is through a tower-based broadcasting approach. As previously mentioned, depending on the size of the bulk material dispersing system 1, different vehicular platforms may be used in order to transport or otherwise operate the bulk material dispersing system 1.

As previously discussed, the battery system 100 may provide power to the one or more pumps 200, including a hydraulic pump 200 that in turn delivers a flow of hydraulic fluid from a hydraulic fluid tank (not shown) for performing certain operations associated with the bulk material dispersing system 1. In one form, the use of hydraulics may be reduced or even substantially eliminated within the bulk material dispersing system 1, such as in the case of a majority or completely electric approach, In addition to reducing or eliminating objectionable environmental gaseous emissions relative to ICE power supplies, the battery system 100 has other benefits, including noise levels while running. This in turn allows for use in more populated areas without inducing noise pollution.

Relatedly, while the battery system 100 is shown presently as being a singular unit, in another form (not shown), it may be made up of numerous smaller subunits that may distributed throughout the bulk material dispersing system 1. In such a configuration, each of the subunits that together make up the battery system 100 may provide dedicated power to one or more components such as each of the one or more pumps 200.

Figure 4:
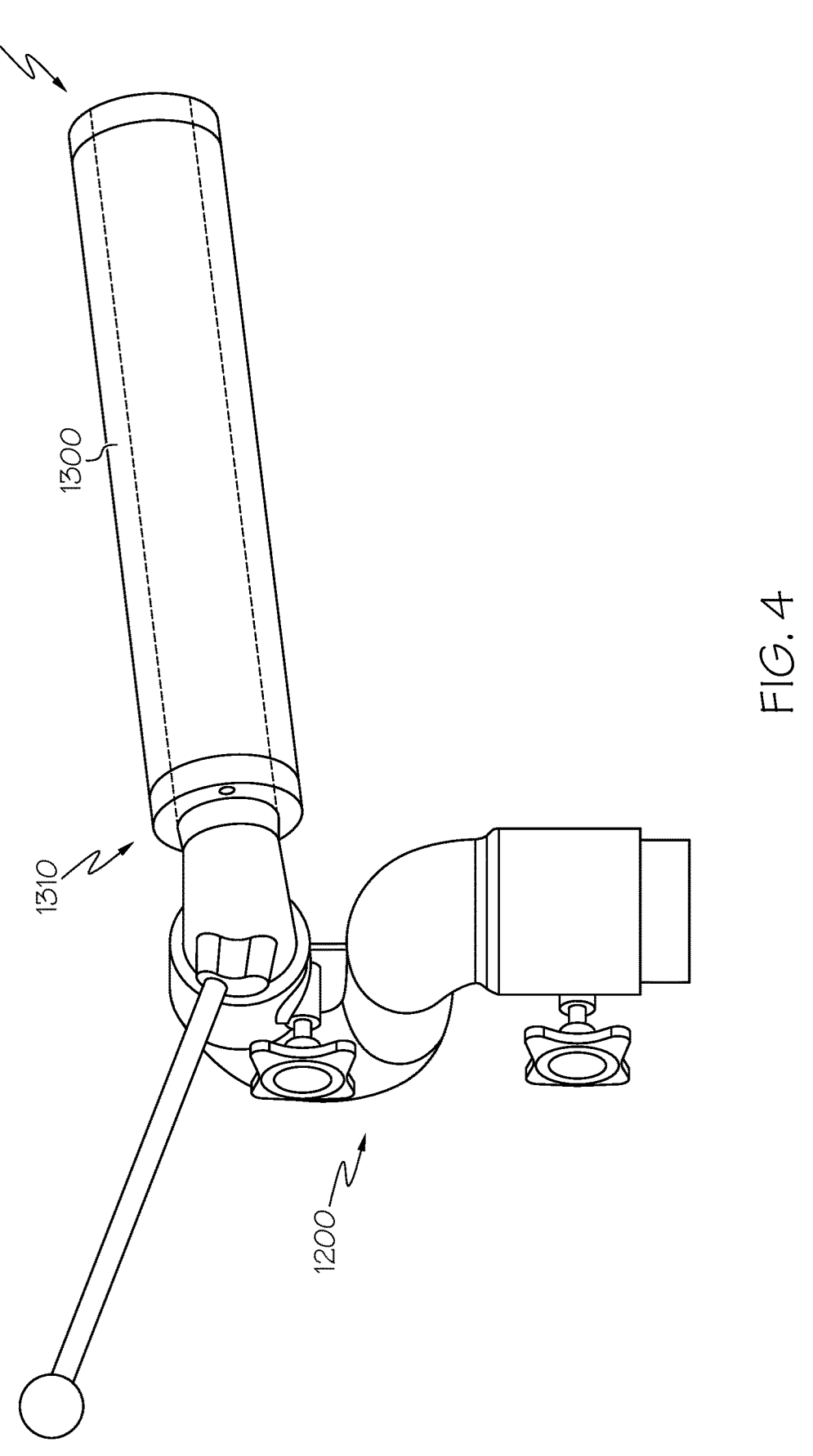
FIG. 4 depicts one version of a spray nozzle and portion of an accompanying monitor tower that may be used with certain embodiments of the electric-powered bulk material dispersing system disclosed herein.

Referring with particularity to FIG. 4, in one form, the spray nozzle 1300 may be attached to the end of a spray monitor 1200 and configured to reduce flow separation, slurry turbulence or tangential flow of the bulk material being dispersed. The resulting more uniform slurry velocity profile in the flow direction contributes to an increased discharge distance may be obtained as the slurry is discharged compared to traditional nozzles. Such a spray nozzle 1300 is described in more detail in patent application 62/889,200 entitled HYDRAULIC SPRAY NOZZLE FOR HYDROSEEDING SYSTEMS that was filed on Aug. 20, 2019, is owned by the assignee of the present disclosure and the details of which are incorporated by reference in their entirety herein.

Figure 5A:
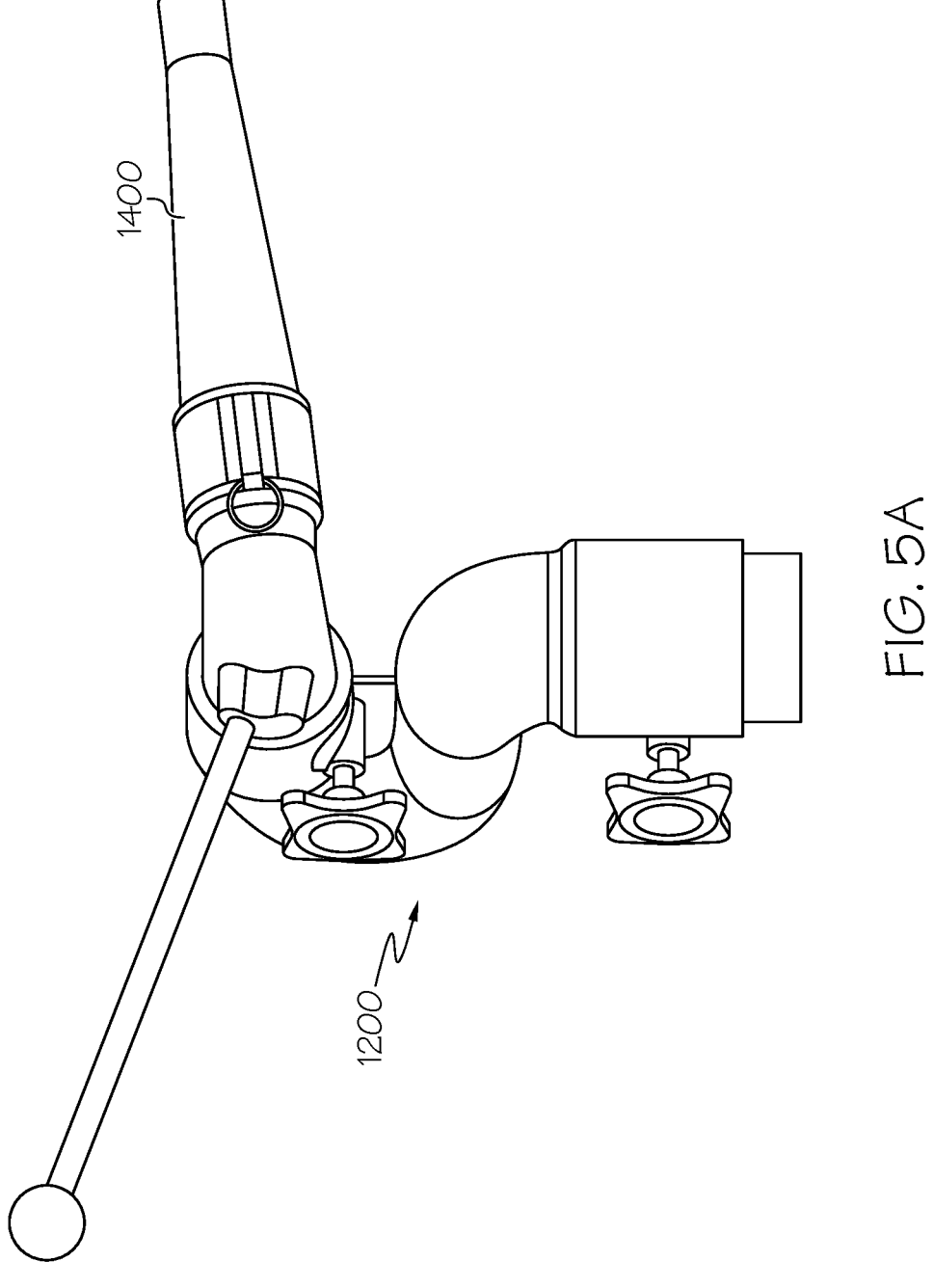
FIG. 5A depicts another version of a spray nozzle and portion of an accompanying monitor tower that may be used with certain embodiments of the electric-powered bulk material dispersing system disclosed herein.
Figure 5C:
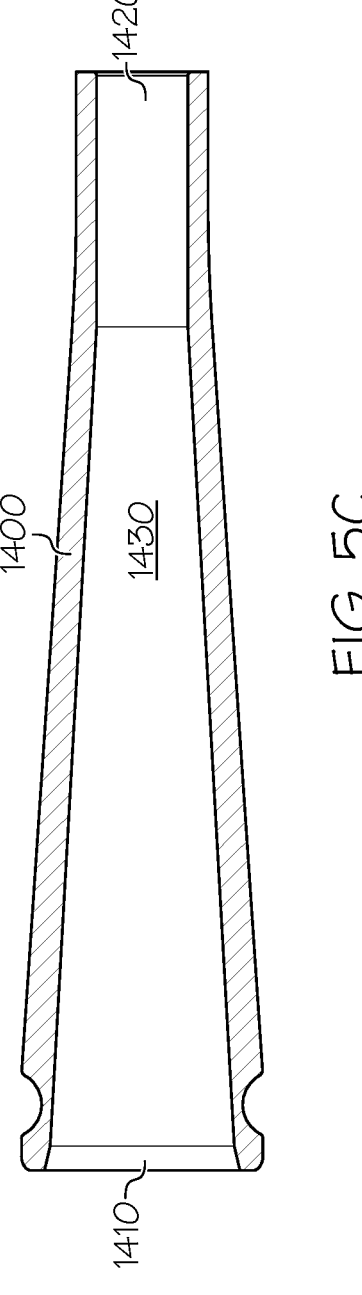
FIG. 5C depicts a side cutaway view of the spray nozzle of FIG. 5A.
Figure 5B:
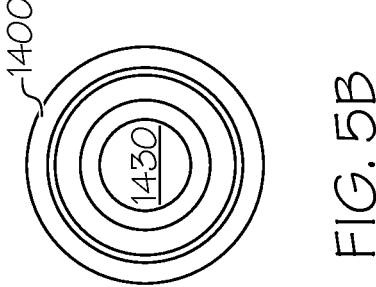
FIG. 5B depicts an axial view down the bore of the spray nozzle of FIG. 5A.

Referring with particularity to FIGS. 5A through 5C, the flowpath and related changes in cross-sectional area of one particular form of the spray nozzle 1400, as well as its connection to the spray nozzle monitor 1200 is shown. The spray nozzle 1400 has an internal flowpath that reduces in a tapered manner over nearly its entire length. It will be appreciated that both configurations of the spray nozzles 1300, 1400 depicted herein are within the scope of the present disclosure, as are variants of the same.

With particular regard to the spray nozzle 1400 of FIGS. 5A through 5C, the internal flowpath 1430 defines a generally tapered or converging shape from the inlet 1410 to the outlet 1420. Such tapered shape and its corresponding gradual change in cross-sectional area of the internal flowpath 1430 helps to prevent stagnant areas, so-called "dead spots" and related generation of eddy flows. In turn, this can produce a relatively coherent flow profile that reduces the radial components of the flow velocity of the bulk material; this is believed to promote a more uniform jet of dispersed bulk material, as is the resulting reduction of the wall boundary layer and attendant turbulence losses.

Within the present disclosure, the term "bulk material" may include any material that may be entrained in a fluent material for distribution. For instance, bulk material may include composts, chipped woods, chipped barks, mulches, seeds, grains, hays, fertilizers, sands, herbicides, pesticides, plastic pellets, salts or the like. The bulk material may be mixed with other solids, liquids or both either prior to, during or after entraining with the fluent material. For instance, mulch may be treated with water before, during or after entraining in order to prevent significant diffusing of the mulch into the atmosphere, thereby more efficiently and effectively placing material on a surface in the desired distribution area. In another example, seed may be mixed with compost or fertilizer to encourage seedling growth. In another application, the bulk material may be mixed with solid or liquid herbicides or pesticides to deter weed growth, as well as to protect plants and other living organisms. As such, a bulk material dispersing system 1 in general and a bulk hydroseeding system in particular may receive, contain, agitate and disperse large quantities of the bulk material to allow broad coverage of a piece of land (such as—depending on the capacity of the raw material hopper 600—between $\frac{1}{10}$ of an acre to about 1 acre) without having to refill.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. It is further noted that terms like "preferably," "commonly," and "typically," are not utilized to limit the scope of the claims or to imply that certain features are critical, essential or even important to the structure or function of the claims. Rather, these terms are merely intended to identify particular aspects of an embodiment or to emphasize alternative or additional features that may or may not be utilized in a particular embodiment of the present disclosure.

Within the present disclosure, the use of the prepositional phrase "at least one of" is deemed to be an open-ended expression that has both conjunctive and disjunctive attributes. For example, a claim that states "at least one of A, B and C" (where A, B and C are definite or indefinite articles that are the referents of the prepositional phrase) means A alone, B alone, C alone, A and B together, A and C together, B and C together, or A, B and C together. By way of example within the present context, if a claim recites that the wound irrigation treatment system may selectively adjust at least one of an amount of irrigation fluid and an amount of excess fluid, and if such adjustment is the addition or removal of one or both of the irrigation and excess fluids, then such data acquisition satisfies the claim.

Within the present disclosure, the following claims are not written in means-plus-function format and are not intended to be interpreted based on 35 USC 112(f) unless and until such claim limitations expressly use the phrase "means for" followed by a statement of function void of further structure.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bulk material dispersing system comprising:
a frame;
a raw material hopper coupled to the frame and configured to contain a slurry therein, wherein at least a portion of the frame extends beneath the raw material hopper;
a plurality of electric motors;
a battery system configured to provide electric current to each of the plurality of electric motors, the battery system comprising an array of battery packs arranged within the frame;
a pump cooperative with a at least one of the plurality of electric motors in order to receive motive power therefrom;
an agitator disposed within the raw material hopper and configured to mix the slurry contained therein, the agitator coupled to an agitator motor of the plurality of electric motors;
a slurry discharge assembly in fluid communication with the raw material hopper such that upon operation of the at least one of the plurality of electric motors and the pump, the slurry becomes pressurized in the slurry discharge assembly and discharged therefrom, the slurry discharge assembly comprising a hose reel mounted to an upper platform of the frame at a position above the array of battery packs;
an operator control panel housing having an angled, upwardly facing surface obliquely angled relative to a horizontal top surface of the frame; and
an operator control panel mounted to the angled, upwardly facing surface between the raw material hopper and the battery system, the operator control panel operable to independently control operation of the agitator and the pump".

2. The bulk material dispersing system of claim 1, wherein the plurality of electric motors, battery system, the pump and slurry discharge assembly are secured to the frame.

3. The bulk material dispersing system of claim 1, further comprising a clutch rotatably disposed between the at least one of the plurality of electric motors the pump.

4. The bulk material dispersing system of claim 1, wherein the slurry discharge assembly comprises at least one of a monitor, a hose and a nozzle.

5. The bulk material dispersing system of claim 4, wherein the nozzle defines a tapered internal flowpath.

6. The bulk material dispersing system of claim 1, wherein the bulk material dispersing system comprises a hydroseeder.

7. The bulk material dispersing system of claim 1, wherein the at least one of the plurality of electric motors is directly coupled to the pump.

8. The bulk material dispersing system of claim 1, wherein the at least one of the plurality of electric motors is indirectly coupled to the pump through at least one of an intermediary hydraulic system or pneumatic system.

9. A method for dispersing a slurry with a bulk material dispersing system, the method comprising:
configuring the bulk material dispersing system to comprise a frame, a raw material hopper coupled to the frame with an agitator disposed therein, wherein the at least a portion of the frame extends beneath the raw material hopper, a plurality of electric motors wherein the agitator is coupled to an agitator motor of the plurality of electric motors, a battery system configured to provide electric current to each of the plurality of electric motors, the battery system comprising an array of battery packs arranged within the frame above the, a pump cooperative with at least one of the plurality of electric motors in order to receive motive power therefrom, and a slurry discharge assembly in fluid communication with the raw material hopper, the slurry discharge assembly comprising a hose reel mounted to an upper platform of the frame at a position above the array of battery packs, and an operator control panel housing having an angled, upwardly facing surface obliquely angled relative to a horizontal top surface of the frame; an operator control panel mounted to the angled, upwardly facing surface between the raw material hopper and the battery system, the operator control panel operable to independently control operation of the agitator and the pump; and
upon receipt of input instructions from a user, having the battery system provide a substantial entirety of the power required to operate the pump, plurality of electric motors and slurry discharge assembly such that the slurry is dispersed from the bulk material dispensing system.

10. The method of claim 9, wherein the bulk material dispersing system comprises a hydroseeder.

11. The method of claim 9, further comprising the discharge assembly to terminate in a spray nozzle with a tapered internal flowpath.

12. The method of claim 9, wherein the input instructions are received through an operator control panel that is signally cooperative with at least one of the raw material hopper, agitator, plurality of electric motors, battery system and pump.

13. The bulk material dispersing system of claim 1, wherein the frame comprises a plurality of shelf structures and the battery pack is mounted to the frame within the plurality of shelf structures beneath the hose reel.

14. The bulk material dispersing system of claim 1 wherein the raw material hopper has a capacity of 300 gallons, 600 gallons, 750 gallons, 900 gallons, 1200 gallons, 1700 gallons, 3300 gallons, or 4000 gallons.

15. The bulk material dispersing system of claim 1, further comprising an operator control panel mounted to the frame between the raw material hopper and the battery system, the operator control operable to independently control panel operation of the agitator and the pump.

16. The bulk material dispersing system of claim 1, wherein at least one of the plurality of motors is positioned at a location positioned longitudinally between the raw material hopper and the batter system.

17. The bulk material dispersing system of claim 1, wherein the raw material hopper comprises an angled surface aligned with and substantially parallel with the angled, upwardly facing surface of the operator control panel housing.

\* \* \* \* \*